UNITED STATES PATENT OFFICE.

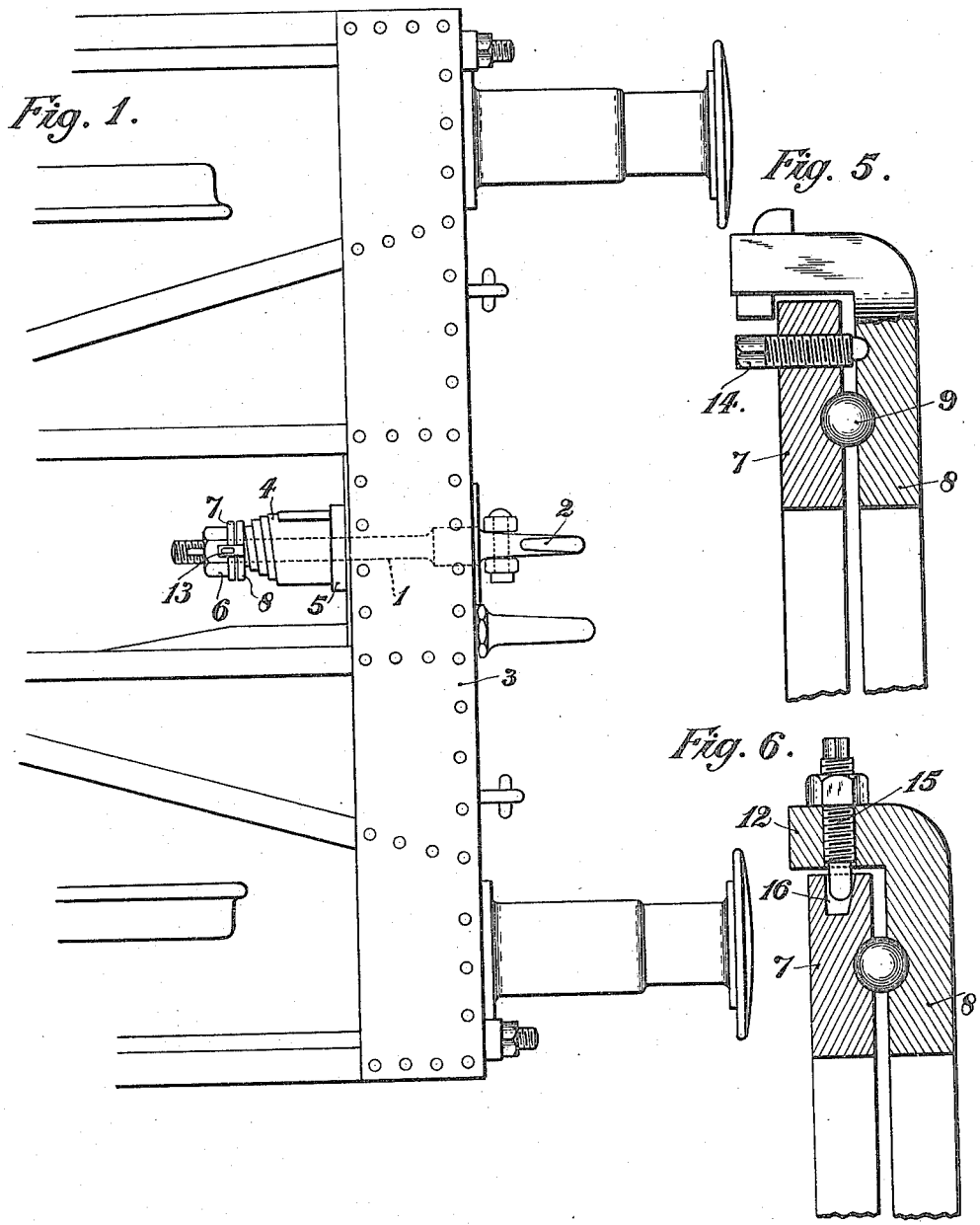

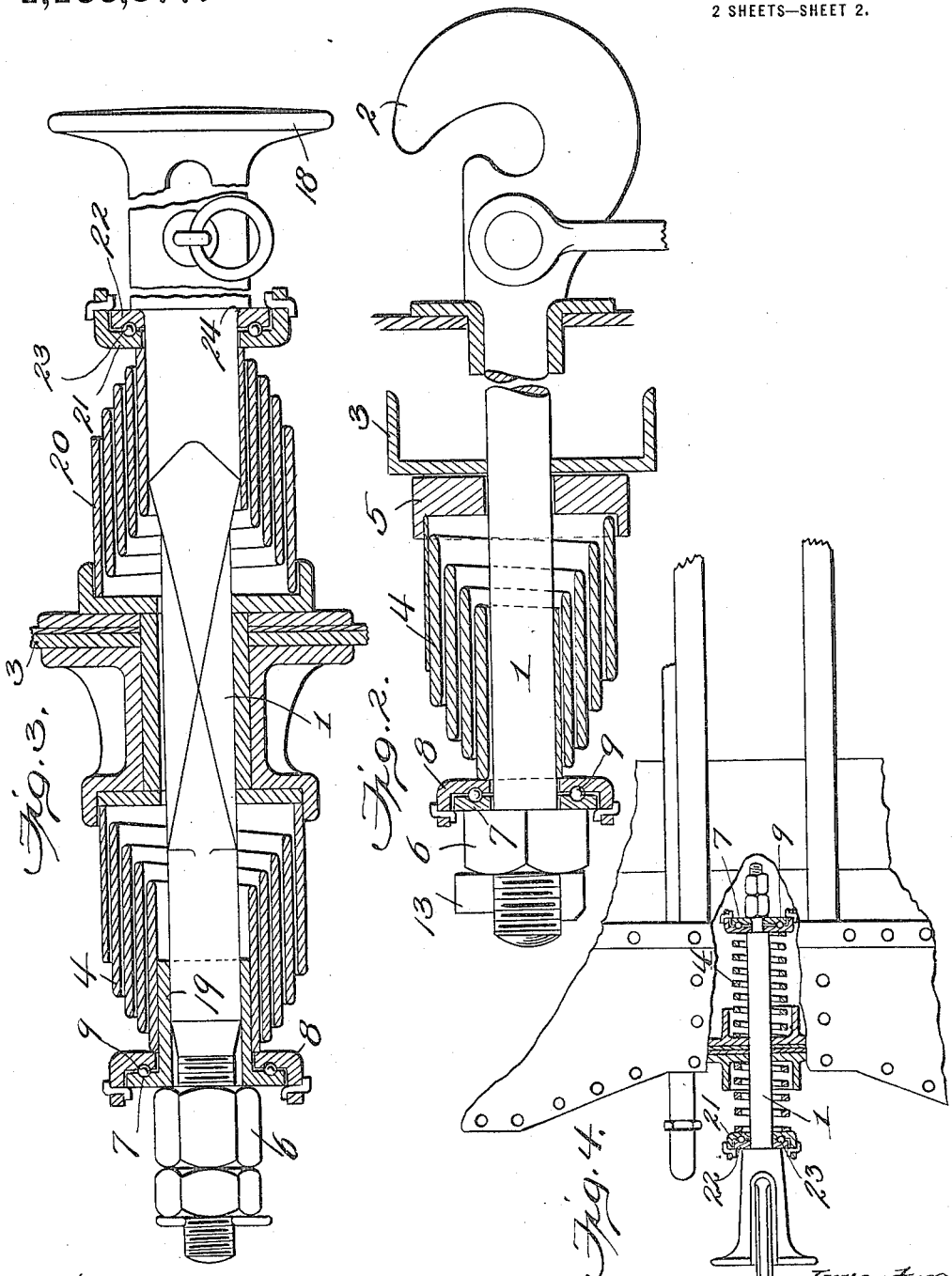

JOHN LEVICK, JR., OF HANDSWORTH, BIRMINGHAM, ENGLAND.

DRAW AND BUFFER GEAR FOR RAILWAY AND OTHER VEHICLES.

1,166,377.   Specification of Letters Patent.   Patented Dec. 28, 1915.

Application filed November 21, 1914. Serial No. 873,396.

*To all whom it may concern:*

Be it known that I, JOHN LEVICK, Jr., subject of the King of Great Britain, residing at 6 Robert road, Handsworth, Birmingham, England, have invented certain new and useful Improvements in Draw and Buffer Gear for Railway and Other Vehicles, of which the following is a specification.

This invention relates to draw-gear and buffer gear for railway and other vehicles, said draw and buffer being of that type in which the pull upon the coupling hooks or thrust upon the buffer members are transmitted to the vehicle through the medium of a helical or volute coiled spring surrounding the draw-bar or buffer rod and bearing against a nut, disk, or other abutment on said draw-bar or buffer rod. When the spring is compressed it tends to rotate and to cause the draw-bar or buffer rod and coupling member to turn or twist owing to the friction between the said spring and the abutment on the said draw-bar or buffer rod.

The object of the present invention is to obviate this tendency of the draw-bar or buffer rod to turn or twist when the pressure comes upon the spring, which said object it is proposed to attain by the employment of a roller or ball thrust bearing between the spring and the abutment on the draw-bar or buffer rod, so leaving the spring free to unwind. The ball or roller bearing is confined between two race plates or washers, one of which engages directly with the end of the spring, while the other bears against a nut or other abutment on the draw-bar or buffer rod.

Figure 1 of the accompanying drawings represents, in plan, the application of the invention to the draw gear of a railway vehicle. Fig. 2 is a longitudinal section through the draw spring. Fig. 3 illustrates the application of the invention to a combined draw and buffer gear. Fig. 4 illustrates the invention as employed in connection with a combined draw and buffer gear having helical springs. Fig. 5 represents a device which may be employed for adjusting the distance between the ball races. Fig. 6 shows another method of holding the race plates together and adjusting the distance between them.

The same letters of reference indicate corresponding parts in each of the figures of the drawings.

Referring to Figs. 1 and 2, the draw-bar 1, carrying the coupling hook 2 at its outer end, passes through the transverse member 3 of the vehicle, and its inner end, which extends beyond the said member 3, is surrounded by a volute-coiled or helical draw spring 4 supported at its larger end within a socket 5. Screwed upon the extremity of the draw-bar 1 is a nut 6, while interposed between this nut and the spring 4 are two loose plates or washers 7, 8, the one 7 bearing against the face of the nut and the other 8 engaging directly with the end of the spring. Between these plates 7, 8, there is provided a ring of anti-friction balls 9 which engage with annular races, 10, 11, formed respectively in the opposed faces of the two plates, thus forming a ball thrust bearing. The plates 7, 8, are held together by keys 12 passed through lugs 13 upon the plate 8, their outer ends being bent over. When the pull comes upon the draw-bar it is transferred through the nut 6, washer or plate 7, balls 9 and plate 8, to the spring 4, which is thus compressed, but the coils, in turning, merely rotate the first plate 8 a few degrees, the ball bearing 9 preventing the motion being transmitted to the washer 7 and the draw-bar, which latter consequently remains entirely uninfluenced by the compression of the spring.

To provide for adjustment of the bearing by increasing the distance between the race plates 7, 8, adjusting screws 14, as shown in Fig. 5, may be employed, same being carried by one of the plates and having a plain rounded end engaging with a groove in the other plate.

Instead of employing keys for holding the race plates 7—8, together screws 15 (Fig. 6) may be passed through the lugs 13 so that their plain ends engage with an annular groove 16 in the periphery of the plate 7. As shown, the one side of this groove may be inclined, so that by tightening up the screws 15 more or less the bearing may be adjusted as required.

Fig. 3 shows the application of the invention to a combined draw and buffer gear. The rod 1 constitutes a draw-bar or buffer-rod according to whether it receives a pull or a thrust, at its outer end being provided with a buffer member 18 and also with a suitable coupling device. The inner end of the said rod is surrounded by the volute-coiled draw spring 4 which takes a bearing upon the race plate 8 separated from the plate 7, as in the previous cases, by the ball thrust bearing 9. The plate 7, which engages with the nut 6 on rod 1, is shown as being provided with a long boss 19 which supports the spring. Upon the outside of the headstock or frame 3 a buffer spring 20 is provided, similar to the spring 4, and at its outer end it engages with a plate 21 separated from the plate 22 by the ball-bearing 23, said plates 21, 22 being arranged and held together exactly as in the case of the race plates 7, 8, of the draw-gear. The plate 22 engages with a shoulder 24 on the rod 1. When a pull is exerted upon the rod 1 the draw-spring 4 is compressed, rotation of the said rod being prevented by the ball-bearing 9, while when two vehicles come together and a thrust or push is exerted upon the rod 1 the buffer spring 20 is compressed, the bearing 23 preventing rotation of the said rod 1.

Fig. 4 shows the application of the invention when helical springs are used. 4 is the draw-spring and 20 is the buffer spring, both surrounding the draw-bar or buffer rod 1, which carries a buffer and coupling at its outer end. Plates 7, 8, separated by ball-bearings 9 are interposed between spring 4 and the nut 6, and similar plates 21, 22, and bearing 23 are interposed between spring 20 and a shoulder on the rod 1. The ball-bearing washers or plates can also be applied to other types of draw or buffer gear having coiled springs.

Having fully described my invention, what I desire to claim and secure by Letters Patent is:

1. In a draw and buffer gear for vehicles, the combination, with a draw bar, of a fixed abutment on said bar, a coil spring surrounding the draw bar, two race plates loosely mounted between said spring and fixed abutment, and anti-frictional members interposed between said race plates.

2. In a draw and buffer gear for vehicles, the combination, with a draw bar, of a fixed abutment on said draw bar, a coil spring surrounding said draw bar, two race plates between said spring and said abutment, anti-frictional members between said race plates, and means for holding said race plates together.

3. In draw and buffer gear for vehicles, the combination with the draw-bar or buffer rod, of a fixed abutment thereon, a coiled spring surrounding the said draw-bar or buffer-rod, two race plates between the spring and abutment, a ball or roller bearing between the race plates, and means for holding the race plates together comprising lugs on one of the plates and keys passed through the lugs.

In testimony whereof I have hereunto set my hand in presence of two subscribing witnesses.

JOHN LEVICK, Jr.

Witnesses:
HENRY NORTON MERRETT,
WILLIAM STAITES SKERRETT.